United States Patent Office 3,212,903
Patented Oct. 19, 1965

3,212,903
FROZEN BISCUIT DOUGH AND
ITS PREPARATION
Margaret L. Oberholtzer, 1515 Birch Lake Ave.,
White Bear Lake, Minn.
No Drawing. Filed Dec. 16, 1954, Ser. No. 475,833
5 Claims. (Cl. 99—90)

This application is a continuation in part of my co-pending application, Serial No. 382,846, filed September 28, 1953, and now abandoned, and the invention concerns essentially corn meal biscuits, short cake biscuits and cheese biscuits. More particularly this disclosure relates to improve biscuits of the above named character, packaged in the raw dough state or in the cook state with long merchandising shelf life without the necessary addition of the many inhibitors currently used in hot breads and the like.

As described in my above mentioned application, the dough and batter mixes before baking can be frozen and kept indefinitely before baking. The time of keeping is usually measured by periods of weeks in the frozen state either of the frozen doughs or the baked goods, and without freezing for periods of several days up to a period of at least a week in the baked state. Then after baking the biscuits are rewarmed to rewarming temperature to produce products having the appearance and taste of freshly prepared baked hot biscuits. The time period of keeping a known hot bread product in the baked state, for merchandising, is measured as one or two days and not in terms of five or six days or even a week.

At the present time there is no known biscuit as herein described which can be packaged and hard frozen in the dough state for merchandising and home baking as a baked biscuit or muffin as herein described which can be frozen and rewarmed to produce a product having the appearance and taste of freshly prepared baked biscuits. In fact, the conventional known biscuits must be eaten immediately after baking and cannot be rewarmed to be made platable.

Accordingly, it is an object of this disclosure to provide a packaged hard frozen corn meal biscuit as a new merchandisable article of sale in the frozen uncooked state or in the baked state, either frozen or refrigerated, which can be immediately baked from the frozen state or rewarmed if in the baked state to produce a product having the appearance and taste of freshly prepared and baked corn meal biscuits. In addition, the corn meal biscuit packaged in the backed state has a shelf life at normal room temperature of over one week without noticeable staling when eaten in the cold or rewarmed state.

Another object of this disclosure is to provide an improved packaged hard frozen short cake biscuit as a new merchandisable article of sale in the packaged frozen uncooked state or in the baked state, either frozen or refrigerated, which can be immediately baked from the frozen state or rewarmed if in the baked state to produce a new short cake biscuit having the appearance and taste of freshly prepared and baked short cake material.

An additional object of this improvement in the art is to provide methods of preparing, packaging and freezing, or freezing and packaging doughs and biscuits prepared with thickened, coagulated and enriched vegetable oils in combination with soured milk.

A further object of this improvement in the art is to provide additional new and useful articles of commerce of the character of packaged baked corn meal biscuits, short cake biscuits and cheese biscuits which can be retained either in a frozen state or under refrigeration and rewarmed to the appearance and taste of freshly prepared and baked products.

To prepare a packaged frozen corn meal biscuit dough for immediate baking at a later date, a mixture of the following ingredients is compounded:

1½ cup flour
1½ cut corn meal
   (may be varied with ratio of corn meal to taste)
⅓ cup prepared coagulated enriched vegetable oil composition
4 teaspoons baking powder
1 teaspoon salt
¾ cup milk, added last The prepared vegetable oil composition is a thickened, coagulated and enriched vegetable oil, generally of the character of salad dressing, preferably of the mild mayonnaise type of the well known commercial grade and purchased on the open market as such. Otherwise the vegetable oil composition is a known homogenized salad dressing type material which contains a prepared composition of vegetable oil containing a combination of ingredients of the character of vinegar and lemon juice, vegetable oil, salt, sugar, eggs and in addition, if desired, seasoning of the character of mustard and pepper which may or may not be incorporated in the mixture in the making of a special prepartion for the wholesale manufacture of frozen bakery goods, as herein described.

Each example, a thickened coagulated and enriched vegetable oil as a preparation for mixing into the above recipes or other recipes as herein illustrated, in prepared as follows:

1   teaspoon powdered sugar
  1   teaspoon salt
  1½ cups vegetable oil
  2   tablespoons vinegar
  2   tablespoons lemon juice
  1   egg yolk To compound the ingredients mix the dry materials and add the egg yolk. Mix until blended and add half the lemon juice. Mix continuously adding the oil gradually as the mixture thickens and reaches uniform coagulated consistency. When mixture becomes thick, add vinegar, balance of lemon juice and oil alternately until used and continue beating until mixture is fully blended. While not necessary, to this mixture may be added 1 teaspoon mustard and a small pinch of cayene, although, as heretofore indicated, the mustard and pepper may be eliminated or reduced in the preparation of the prepared mixture for addition to the products as herein described.

In preparing the corn meal biscuit dough, the dry ingredients are mixed until a uniform blend is produced. Then the liquids are added and mixed to form a uniform dough. This dough is kneaded slightly on a floured board only until the doughy mass is not sticky. The dough is then rolled out to from ½ inch to ¾ inch thickness, or thinner, if desired, and cut into biscuit form. The cut biscuits are then placed in a prepared packaging metal foil baking pan, with the cut edges of the biscuits in slightly spaced, or at least ½ of the circumference in non-touching relationship. In the freezing process the spaced relationship of the cut biscuits is of critical value if the original position of the biscuit is in a permanent position for baking. After freezing, as hereinafter described, the biscuit can be packaged in close relationship and baked in close relationship if a soft sided biscuit is desired. The pan may be of the character as disclosed in Patent No. 2,649,379, and the biscuits are allowed to start their natural raising action for a few minutes (approximately 5 minutes). The package is then wrapped, keeping the space or an air pocket between the biscuits, before wrapping and sealing in an air tight film or bag, and sealed in a transparent or other wrapper in a conventional wrapping machine.

The sealed package is then placed immediately into a quick freeze, such as a freezing tunnel or deep freeze and kept in this frozen condition until merchandised and refrozen at home or the frozen biscuits are immediately placed in an oven with or without thawing for baking at from 425° F. to 450° F. for from 15 to 20 minutes, or until the top crust is a light golden brown. The preliminary standing or interval before freezing produces a lighter texture biscuit. However, the preliminary standing may be dispensed with and the packaged dough immediately frozen. Thawing of the packaged product preliminary to baking is unnecessary and produces no noticeable improvements, as the biscuit is found to rise in the subsequent baking operation.

Otherwise, if desired, the biscuit dough can be baked imediately at approximately 450° F. for from 10 to 15 minutes, or until a light golden brown. After baking the biscuits are packaged immediately in an aluminum bag or other sealable air tight container and refrigerated or frozen for merchandising and subsequent rewarming before eating. When rewarmed even after a period of a week from the frozen state, or after a period of at least a week standing in the unrefrigerated state, the baked biscuits have the appearance and taste of freshly preapred and freshly baked biscuits. In an actual test of the keeping quality of the baked corn meal biscuits, several were placed in an aluminum foil bag with the top twisted and placed on a kitchen shelf at a normal home temperature. Two weeks later some of the biscuits were eaten and others tasted and tested by an expert baker, without warming, who could find nothing wrong with them. Thus the shelf life of the corn meal biscuit under normal room temperature is several days without an additive. If desired, a harmless aging or staling inhibitor in the nature of .001 to .005 percent by weight sodium diacetate may be added to the dough mixtures to prolong or increase the shelf life to at least or over 10 days or two weeks.

A modified method of packaging the prepared dough is by stacking the cut biscuit dough in a can of the character as disclosed in Patent No. 2,478,618, and immediately freezing, with or without any preraising and without any preliminary baking. The hard frozen packaged dough biscuits when prepared in the manner as described are non-sticky and freeze to a solid state. When broken open the hard frozen biscuits, with or without thawing, are placed in a baking tin for baking in an oven at 400° F. to 450° F. and baked for approximately 15 minutes or until a light golden brown. The critical relationship of the frozen biscuit is maintained in the baking operation because the biscuits are separated from the packaged state and placed in a contacting relationship with at least and more than one-half of the biscuit circumference being in spaced relationship to each other or with air pockets for heat transfer about the major portion of the biscuit edges. This relationship is a critical necessity, for all of the frozen dough products, as herein described, and also the dough biscuit and muffin products described in my prior application when frozen and packaged for subsequent baking, as disclosed herein.

*Shortcake biscuit*

2 cups flour
4 teaspoons baking powder
1 teaspoon salt
¼ cup sugar
⅞ cup milk
6 tablespoons mayonnaise (or the prepared mixture as described)
1 egg (slightly beaten)

Mix the dry ingredients to a uniform blend. Add the liquids in the order listed. Mix to a uniform blend, knead the dough until the dough mass is not sticky. Level the dough to approximately half inch thickness and cut into large biscuit forms. Place the biscuits into a metal foil pan, for example of the character as disclosed in Patent No. 2,649,379, in the manner as heretofore described. Otherwise the biscuits can be frozen with or without preliminary expansion, as they are made and packaged in a container of the character of Patent No. 2,478,618. Allow the packaged biscuits to stand for 7 to 10 minutes at room temperature and then wrap with a transparent or other wrapper and seal air tight. Place immediately in a freeze tunnel or freezer chest and freeze solid. From the frozen solid state the biscuits are immediately, or shortly after merchandising, baked at 425° F. to 450° F. for a period of 15 to 20 minutes or until the top crust is light and golden.

Otherwise, after standing, and before packaging or wrapping the biscuits are baked at 450° F. for from 10 to 15 minutes or until the top crust is light and golden. Then wrap and seal and place in a freeze tunnel or deep freeze chest for immediate freezing. The packaged biscuit has a long shelf life and can be taken home, rewarmed from the frozen or thawed state, split and covered with crushed fresh berries or other fruit and whipped cream.

*Cheese biscuits*

2 cups flour
4 teaspoons baking powder
1 teaspoon salt
(sifted if desired)
¼ lb. mild American type cheese, grated or cut into approximately ¼ inch squares, or as an alternate, an American cheese blend or spread type cheese can be used
4 heaping tablespoons mayonnaise or the prepared type composition, as described
⅞ cup milk, preferably added last Mix above ingredients in order listed. Prepare dough, with the cheese uniformly distributed throughout. Knead the dough slightly on a floured board only until the doughy mass is not sticky. Pat out gently to about ½ inch thickness and cut into biscuit forms.

As heretofore described, the prepared cut biscuit dough is preferably allowed to stand for about 5 minutes and then immediately placed in a quick freeze unit to freeze to a solid state. When frozen in this manner the biscuits may be packaged in an air tight aluminum foil bag for subsequent baking, with or without thawing, by placing in a baking pan, in a touching side by side relationship. Then the biscuits are baked at approximately 400° F. to 450° F. for about 15 to 18 minutes, or until the top crust is light and golden.

A modified method of packaging the cut biscuit dough is in an aluminum foil baking pan, in which the articles are dispensed for baking, as frozen, is to place the cut biscuits in the pan in a spaced relationship, allow to raise for about 5 minutes and then wrap in an air tight plastic sealed cover. Thereafter quick freeze the packaged biscuits in a freezing tunnel or quick freezer. When the packaged biscuit is dispensed it may be baked immediately, as above indicated, making sure that in the baking operation that the frozen dough is only touching on the sides and that at least one-half or more of the circumferential edges of the cut biscuits are exposed to an air pocket between adjacent biscuits. That is, when the biscuits are packed for baking in the container in which sold they cannot be packed in cluster form but may rest in a two by two relationship. If clustered, they must be separated into only corner or edge touching relationship, as described, for baking. In the frozen state the touching edges of the circular biscuits provide an air pocket when moved into a baking tin. This is a critical relationship in baking from the frozen state.

Otherwise the cut biscuits can be immediately packed into containers of the character as disclosed in Patent No. 2,478,618, and immediately frozen or refrigerated for subsequent keeping in a holding unit or store freezer until disposed of and taken home, placed in a baking tin and baked, in the manner as indicated.

If desired, for immediate baking, the cut dough may be immediately placed in baking tins in as close touching relationship as desired, dependent upon the particular crust or softness required of the finished biscuit sides. The baking operation takes from 10 to about 15 minutes or until the top crust is light golden, at from 425° F. to 450° F. Thereafter the baked biscuits are packaged in an aluminum foil bag or other sealed wrapper and placed in a quick freezing chest until frozen. Then the biscuits are kept frozen in a freezer holding unit until merchandised. Thereafter, with or without thawing the biscuits are rewarmed to provide a product having all the attributes, appearance and taste of freshly prepared, fresh baked biscuits.

In the above disclosure it will be understood that the terminology of quick and deep freeze is made with reference to freezing and holding the frozen products until they are disposed or merchandised from the frozen state. After which the prepared dough, when packaged in the critical manner as described in a foil baking carton, or otherwise subsequently placed in baking tins can be baked from either the frozen or thawed state, and then if desired refrozen until rewarmed to produce a baked product having the appearance and taste of freshly prepared, freshly baked biscuits.

Otherwise, the baked products are quick frozen and held in a holding freezer for merchandising. The products when under refrigeration have long shelf life which is indefinite when in the frozen state, and even without refrigeration can be eaten at least a week after baking with no development of bad odors or taste. After baking and keeping, the surprising and amazing fact is that the biscuits, as herein disclosed, can be rewarmed to a fresh biscuit state, and when in the frozen dough condition can be baked directly to produce a raised light palatable biscuit. The preliminary step of a short raising period before freezing is important in obtaining a higher and lighter biscuit than that which is made from chilled ingredients and immediately frozen. However, in some instances the higher and lighter biscuit may not be desirable and therefore the direct freezing is preferred.

Further it will be understood that when the products as herein described are to be used within a few hours or the dough is to be merchandised as made and taken home for cutting and baking, it may be packaged in an air tight container and retained under less than freezing refrigeration as a temporary hold-over of the dough. When packaged in the unfrozen form, the dough is preferably sold in flat layers of ½ inch to ¾ inch thickness (the original thickness for cutting biscuits) and when cut in the home the cut out corners are not a waste, as the odd pieces are reformed by hand and recut.

Having thus described my new and useful improvements in the culinary art the new products of merchandise as described herein, it will be apparent that some modification and changes may be made falling within a reasonable interpretation of the scope of the following claims.

I claim:
1. As an article of merchandise a packaged baking powder biscuit dough prepared with a prefabricated edible normally liquid vegetable oil emulsion of mayonnaise constituency and contained in the hard frozen state with at least one-half of the circumference of the cut edges of the biscuits in on-touching relationship preparatory to baking.

2. The method of preparing baking powder biscuits as and article of merchandise comprising the steps of preparing a baking powder dough material containing the prefabricating constituents flour, baking powder, salt, milk material, and an added prefabricated salad dressing base emulsion comprising an emulsified edible normally liquid vegetable oil as the shortening constituent, flouring and rolling the dough to about ½ inch to about ¾ inch thickness, cutting the biscuits from the dough, holding the dough for a short interval until a natural rising action starts, packaging the cut biscuits, freezing the packaged biscuits, and holding the cut biscuits in the packaged frozen state until dispensed.

3. The method of claim 2 wherein the biscuit dough material is frozen and packaged.

4. The method of claim 2 wherein the steps comprise holding the prepared dough for a short interval until a natural rising action starts, cutting the dough into biscuit forms, freezing the cut biscuits, packaging the frozen biscuits, and holding the biscuits in the frozen state until dispensed.

5. The method of claim 2 wherein the steps comprise cutting the biscuits from the dough, packaging the biscuits after cutting, holding the packaged biscuits at normal temperature for a short interval until a slight rising action is effected, freezing the packaged biscuits, and holding the biscuits in the frozen state until dispensed.

References Cited by the Examiner
UNITED STATES PATENTS

| | | |
|---|---|---|
| 2,508,393 | 5/50 | Jaeger. |
| 2,549,595 | 4/51 | Gregor _____ 99—90 |
| 2,649,379 | 8/53 | Woods _____ 99—192 |
| 2,815,286 | 12/57 | Andre et al. |

OTHER REFERENCES

Betty Crocker's "Picture Cook Book" (1st ed.), 1950, McGraw-Hill Publ. Co., Inc., p. 433.

"The Bread Tray," 1944, by L. De Gouy, publ. by Greenberg (N.Y.), pp. 26 and 27.

"Everybody's Cook Book," 1924, by I. Lord, publ. by Henry Holt & Co., New York, pp. 100 to 103.

"Experimental Cookery," 1942, by B. Lowe, publ. by John Wiley & Sons, Inc. (New York), pages 266, 275, 286 and 287.

"Food Technology," vol. 3, No. 5, May 1949, pp. 160 to 162.

A. LOUIS MONACELL, *Primary Examiner.*

ABRAHAM H. WINKELSTEIN, *Examiner.*

UNITED STATES PATENT OFFICE
CERTIFICATE OF CORRECTION

Patent No. 3,212,903 October 19, 1965

Margaret L. Oberholtzer

It is hereby certified that error appears in the above numbered patent requiring correction and that the said Letters Patent should read as corrected below.

Column 6, line 7, for "on-touching" read -- non-touching --.

Signed and sealed this 20th day of September 1966.

(SEAL)
Attest:

ERNEST W. SWIDER
Attesting Officer

EDWARD J. BRENNER
Commissioner of Patents